United States Patent [19]
Parish

[11] Patent Number: 5,843,221
[45] Date of Patent: *Dec. 1, 1998

[54] SPRAYABLE COATING COMPOSITION

[75] Inventor: David Michael Parish, West Chester, Ohio

[73] Assignee: Illinois Tool Works, Inc., Glenview, Ill.

[ * ] Notice: The term of this patent shall not extend beyond the expiration date of Pat. No. 5,549,969.

[21] Appl. No.: 905,834

[22] Filed: Aug. 4, 1997

[51] Int. Cl.$^6$ .............................. C09D 5/34; C08K 3/32; C08K 3/36; C08L 63/10

[52] U.S. Cl. ................ 106/469; 106/287.1; 106/287.24; 106/287.29; 106/462; 523/219; 523/515; 525/445; 525/531; 525/922

[58] Field of Search ............................. 106/469, DIG. 4, 106/287.23, 287.24, 287.1, 287.29, 462, 466; 523/218, 219, 515, 521; 525/445, 531, 922

[56] References Cited

U.S. PATENT DOCUMENTS

| | | |
|---|---|---|
| 4,011,195 | 3/1977 | Self . |
| 4,771,086 | 9/1988 | Martin ...................................... 523/205 |
| 4,967,956 | 11/1990 | Mansfield . |
| 5,057,555 | 10/1991 | White et al. . |
| 5,171,613 | 12/1992 | Bok et al. . |
| 5,358,779 | 10/1994 | McGarry . |
| 5,371,117 | 12/1994 | Parish et al. . |
| 5,374,305 | 12/1994 | Glancy et al. ...................... 106/287.23 |
| 5,374,669 | 12/1994 | Parish et al. . |
| 5,549,969 | 8/1996 | Parish . |

*Primary Examiner*—Michael Marcheschi
*Attorney, Agent, or Firm*—Killworth, Gottman, Hagan & Schaeff L.L.P.

[57] ABSTRACT

A sprayable, high solids, low-volatiles composition is provided which may be used as a coating on a variety of substrates. The sprayable filler composition comprises a first filler/glazing component formed from a mixture of a resin, a filler, a mixture of thixotropic clays, a phosphosilicate, and a first organic solvent. The coating also has a second organic solvent component as well as a second catalyst component. The coating as applied to a substrate has a thickness of up to 6 mils without sagging, running or cracking.

14 Claims, No Drawings

SPRAYABLE COATING COMPOSITION

FIELD OF THE INVENTION

The present invention relates to a sprayable composition, and more particularly, to a very high solids, low-volatiles sprayable filler composition which may be used as a coating on a variety of substrates.

BACKGROUND OF THE INVENTION

Multi-component spraying systems which are widely used in the plastics and marine industries. In such systems, a liquid resin and a catalyst for the resin are mixed together and sprayed onto a substrate such that the catalyst and resin react and harden on the substrate. The mixing may be done immediately before spraying (referred to as an internal mix system) or immediately after spraying (referred to an external mix system). In either event, such coatings are referred to as a "gel coat". For example, U.S. Pat. No. 4,967,956 to Mansfield discloses a "gel coat" spraying system which uses a resin such as an epoxy resin or a polyester resin, a catalyst for the resin, and spraying means which includes an airless liquid nozzle. Such gel coats utilize a slow curing process, and the coatings do not provide a sandable surface. Another disadvantage of such gel coatings is that application of the coatings is effected through the use of organic solvents to reduce viscosity.

Because of increased environmental concerns about volatile organic components (VOC's), efforts have been made to reduce the amount of volatile materials used in such coating operations. As a result, the use of high solids coatings has been employed to meet VOC regulations. For example, White et al. U.S. Pat. No. 5,057,555 discloses a coating composition having a high solids content which is used as a finish for automobiles and trucks comprising an acrylic polymer and a catalyst. However, the coating cures very slowly. In addition, the composition still includes from 20–60% of an organic solvent and therefore has a tendency to run and sag when applied to vertical surfaces and can exhibit poor shelf and pot life.

As an alternative to using organic solvents, Bok et al, U.S. Pat. No. 5,171,613, teaches using a supercritical fluid as a non-polluting diluent in combination with a coating mixture. However, the method of spraying the coating requires the use of a heated spray gun to maintain the temperature of the coating mixture.

It is also known through the assignee of the present application that a sprayable, high solids, low-volatile filler composition may be used as a coating on a variety of substrates including metals such as iron and aluminum, concrete, wood, fiberglass and polyester fillers, etc. See, for example, Parish et al U.S. Pat. No. 5,371,117, issued Dec. 6, 1994 which discloses a sprayable filler composition having a first filler/glazing component formed from a mixture of a resin, a filler, a mixture of thixotropic clays, activated fumed silica, hollow glass microspheres, and a ketone solvent and having a second catalyst component. It has also been discovered that such a composition can, in some instances, result in an undesirable degree of an "orange peel" effect which necessitates extensive sanding.

It is also known that various fiber reinforced plastic (FRP) parts such as cured sheet molded compounds (SMC) can form cracks and sink marks which affect surface appearance. SMC is produced from unsaturated polyester or vinyl ester resin primarily. It is formulated with calcium carbonate filler, fiberglass for reinforcement, one or two catalysts, and usually an internal release agent like zinc stearate. The material is "B-staged" (thickened to a semi-solid) in long sheets which are rolled up for storage. When ready to mold, it is cut to mold size, placed into the mold which experiences clamp pressure and heat which fully cures the product in its final shape. Cycle times are usually 3–5 minutes depending on part size. After molding the "Stamped" parts usually have flashing that needs to be removed (usually by sanding), and/or may experience some type of processing like routing-out access holes, etc. This leaves raw edges or spots on the molded piece. When conventional paints are used, solvent can become trapped in these areas and subsequently "pop-out" when heated during normal baking processes. This creates a great deal of unusable parts. This phenomenon is greatly enhanced/accelerated by use of glass bubbles in the SMC formula to provide "low density" parts in an effort to reduce vehicle weight.

Accordingly, it has been suggested that a thin coating made from a liquid rubber and liquid eopxy polymer be used as a primerlike coating to inhibit propagation of micro cracks, reduce porosity and reduce sink marks in FRP parts to provide a suitable smooth surface for automotive body panel applications that serves as a substrate for further paint applications. See, McGarry U.S. Pat. No. 5,358,779, issued Oct. 25, 1994.

It is further known through the assignee of the present application that a sprayable, high solids, low-volatile filler composition may be used on molded fiber reinforced plastic (FRP) parts. See, for example, Parish, U.S. Pat. No. 5,549,969, issued Aug. 27, 1996 which discloses a sprayable filler compositing having a first filler/glazing component formed from a mixture of a resin, a filler, a mixture of thixotropic clays, activated fumed silica, a phosphosilicate, and 0–20% by weight of an organic solvent and having a second catalyst component. While U.S. Pat. No. 5,549,969 discloses that a sprayable, high solids, low-volatile filler composition may be used on molded fiber reinforced plastic (FRP) parts, it has been discovered that such a composition can, in some instances, result in an undesirable degree of waveyness of the surface, both in depth and length of wave, i.e., an undesirable degree of an "orange peel" effect which necessitates extensive sanding/post-processing.

Accordingly, the need remains for an improved coating for substrates which 1) uses a minimum of low-volatile solvents; 2) which is easy to apply; 3) which reduces or eliminates paint "pop-out"; 4) which reduces porosity and sink marks; and 5) which results in a surface which is immediately suitable for subsequent application of top coats.

SUMMARY OF THE INVENTION

That need is met by the present invention. Thus, there is provided a sprayable filler coating composition comprising:

a) a filler/glazing component comprising a mixture of from about 20% to 80% by weight of a resin selected from the group consisting of vinyl ester resins, and vinyl ester resins in combination with polyester resins; from about 2% to about 35% by weight of a sprayable filler such as talc, from about 0.1% to about 15% by weight of a mixture of thixotropic clays, from about 1–10% by weight of a phosphosilicate, from about 0–2% of an accelerator such as dimethyl aniline, cobalt naphthenate, copper napthenate, potassium hexanoate, dimethyl para-toluidine, cobalt neodecanate, or mixtures thereof; and from about 0% to about 20% and preferably from about 5–10% by weight of a first organic solvent or organic solvent mixture;

b) a catalyst component which may be present in an amount of from about 1–50% and preferably about 2–6% by weight of the total coating as applied (i.e., preferably the filler/glazing component comprises about 96–98% of the coating and the catalyst component comprises about 2–6%). The catalyst is preferably methyl ethyl ketone peroxide or cumyl hydrogen peroxide, with cumyl hydrogen peroxide being preferred.

c) and from about 1–15% and preferably from about 5–10% by weight of a second organic solvent component; and The filler/glazing component may further include about 0–4% and preferably 0.2–4% by weight of a coloring agent such as titanium dioxide, black iron oxide, acetylene black, or mixtures thereof; and from about 0–40% by weight of a styrene monomer.

The filler/glazing component may further include about 0–1% fumed silica and 0–5% of an acrylic resin.

This coating provides an improved coating for molded FRP parts which enhances the surface of the molded FRP part which 1) uses a minimum of low-volatile solvents; 2) which is easy to apply by most comon application equipment; 3) which reduces or eliminates paint "pop-out"; 4) which reduces porosity and sink marks; and 5) which results in a surface which is immediately suitable for subsequent application of top coats. The use of a minimum of low-volatile solvents is not only desirable for environmental reasons, but also provides an improved surface quality due to improved flow characteristics (i.e., it does not exhibit the poor characteristics usually associated with high solvent content coatings, such as poor cure times, running and sagging when applied to vertical surfaces and poor build capabilities). In addition, the coating of the present invention has a high gloss and exhibits a long-wave profile, thereby allowing for Class-A surface attainment. Further, although this coating does not require sanding, it may be sanded if additional leveling is required. In addition, the coating is bake temperature resistant while retaining its flexibility and exhibits a high level of conductivity for subsequent electrostatic applications of top coats. This coating, which functions as a primerlike coating, could replace in-mold coatings presently used to enhance surface appearance on molded products from thermosetting FRP from sheet molded compounds (SMC), bulk molding compounds (BMC), and thick molding compounds (TMC). Specifically, this invention is useful in automotive body parts, furniture, sporting goods, chemical processing equipment, and the like.

DETAILED DESCRIPTION OF THE INVENTION

The sprayable filler composition of the present invention comprises a first filler/glazing component including a resin selected from the group consisting of vinyl ester resins and the combination of vinyl ester resins and polyester resins. Such resins provide fast curing and good adhesion. If higher gloss and a non-sanding product is desired, the filler/glazing component preferably contains from about 50–80% and more preferably about 70–80% of a mixture of vinyl ester resins and polyesters. This allows for additional flow and surface leveling as well as a higher gloss and provides for a surface which does not need to be sanded. Such mixture is preferably composed of from about 40–42% vinyl ester resins by weight of the coating and from 30–36% polyester resins by weight of the coating. Suitable polyester resins are auto resin (ortho polyester) and bonding ortho NPG Polyester. Auto resin is available under the Reichhold trademark and the designation 32-266-29, which is a mixture of 36.0% Styrene and proprietary resin, and which has a boiling point of 295° F., a volatile percentage of 7.2%, a vapor density heavier than air and a specific gravity of 1.12–1.16. Bonding ortho NPG polyester is available under the Reichhold trademark and the designation 33-707-00, which is a mixture of styrene of 39% and proprietary resin, and which has a boiling point of 295° F., a volatile percentage of 7.8%, a vapor density heavier than air and a specific gravity of 1.10–1.14.

Suitable vinyl ester resins include 8084 vinyl ester, which is a mixture of 40–50% of a styrene monomer (CAS #000100-42-5) and the balance vinyl ester resin (CAS #068492-68-2), and which has a boiling point of 294° F., a vapor pressure of 7 mmHg at 20° C., a vapor density of 3.6 based on styrene, and a specific gravity of 1.010–1.035, and 411-35 vinyl ester, which is a mixture of 35–50% of a styrene monomer (CAS #000100-42-5) and the balance vinyl ester resin (CAS #036425-16-8), and which has a boiling point of 294° F., a vapor pressure of 7 mmHg at 20° C., a vapor density of 3.6 based on styrene and a specific gravity of 1.025–1.075, both available from Dow Chemical Company of Midland, Mich. under the DERAKANE trademark.

The preferred filler for the filler/glazing component of the present invention is talc, which allows retention of a bridging effect (i.e., the effect of flowing over a small area of porosity and having enough film integrity to resist any surface disruption (popping) upon heating) without contributing to surface roughness. Talc also provides thixotropic properties to the composition and also aids in providing sanding properties to the coated substrate when sanding is desired. A preferred talc is 609 ULTRATALC, available from Mineral Technologies, Inc.

In addition, the filler/glazing component preferably includes about 0–40% and preferably about 30–40% by weight of a styrene monomer. Addition of styrene monomer increases the rate of polymerization and provides a lower viscosity which results in better atomization during spray application while retaining the overall reactivity of the system. However, it should be noted that in instances where vinyl esters alone are used as the resin, an encapsulated petroleum based wax may be used in place of some of the styrene. Suitable waxes include BYK S-740 available from Byk Chemie.

The filler/glazing component may further include from about 0% to about 1% by weight activated fumed silica. Fumed silica is commercially available from DeGussa Company under the trade name AEROSIL 200. The fumed silica is preferably activated by the addition of ethylene glycol. Because fumed silica alters the rheology of the coating in a manner that detracts from surface flow, its use is preferably limited to those instances when the product is to be sanded. When included in the filler/glazing component, fumed silica provides fast viscosity, and also acts as a thixotropic agent.

The filler/glazing component may further include from about 0–5% of an acrylic resin by weight of the filler/glazing component. Because acrylic resin is a saturated solvent dispersed material which is used to assist the sandability of the product, its use is preferably limited to those instances when the product is to be sanded or when the ability to do spot repairs is desired.

The thixotropic clays suitable for use in the filler/glazing component of the present invention include prewet and dry organo clays. A suitable prewet clay is available from Rheox, Inc. under the trade name MPA-60-x. A preferred dry clay is quaternary ammonium bentonite, available from United Catalysts, Inc. under the trade name Advitrol 6-8.

The prewet clay acts as an antisettling agent and also provides thixotropic properties to the composition while the dry clay provides fast shear viscosity, and also provides thixotropic properties.

Preferably, the filler/glazing component includes a coloring agent to form a colored finish. Suitable coloring agents include black iron oxide, available from Pfizer, titanium dioxide (Rutile), available from SCM Chemicals under the designation TIONA RCL-9, and acetylene black, available from Chevron, Inc., with acetylene black being preferred due to its ability to provide better conductivity in a high resin formula.

The filler/glazing component also preferably includes accelerating agents to speed up the curing time. Suitable accelerators include dimethyl aniline, available from Dupont under the designation N DMA, cobalt naphthenate or cobalt neodecanate, available from Mooney Chemical, Inc. under the designation TEN-CEM, copper naphthenate, potassium hexanoate, dimethyl para toluidine or mixtures thereof.

The addition of a phosphosilicate to the filler/glazing component helps assure the adhesion of the coating to the molded FRP part and adds to the durability of the coating. A preferred phosphosilicate is calcium strontium zinc phosphosilicate.

The first organic solvent is chosen from the group consisting of a highly volatile solvent, such as acetone, a solvent of medium volatility, such as ethyl acetate, and a solvent of low volatility, such as para methyl glycol ether acetate or mixtures thereof, with mixtures of such solvents being preferred. More preferably, a mixture of solvents is chosen such that their azeotropic evaporation rate is lowered, allowing more open time (i.e., the time the coating remains flowable for leveling purposes).

The second organic solvent component is chosen from the group consisting of solvents of low volatility. Such solvents have high molecular weights and high flash points. Examples of such solvents are alkoxyalkanol solvents, 2-butoxyethanol being preferred, and ketone solvents containing 5–10 carbons, such as methyl amyl ketone, or mixtures thereof. The addition of the second organic solvent component to the filler/glazing component results in a coating wherein paint "pop-out" is reduced or eliminated and wherein there is not an undesireable degree of an "orange peel" effect. Therefore, the two most unique properties of the coating (its resistance to paint "pop-out" and its ability to provide a surface which, because of it does not exhibit an undesirable degree of an "orange peel" effect, is immediately suitable for subsequent application of top coats) are the result of the addition of the second organic solvent component to the filler/glazing component.

Based on the foregoing, the preferred filler/glazing component of the coating comprises: from about 20% to 80% by weight of a resin selected from the group consisting of vinyl ester resins, and vinyl ester resins in combination with polyester resins; from about 2% to about 35% by weight of a sprayable filler such as talc, from about 0.1% to about 15% by weight of a mixture of thixotropic clays, from about 1–10% by weight of a phosphosilicate, from about 0–2% of an accelerator such as dimethyl aniline, cobalt naphthenate, copper napthenate, potassium hexanoate, dimethyl para-toluidine, cobalt neodecanate, or mixtures thereof; and from about 0% to about 20% by weight of a first organic solvent or organic solvent mixture. The filler/glazing component also includes optionally from 0–4% of a coloring agent selected from the group consisting of titanium dioxide, black oxide, acetylene black, or mixtures thereof, and from 0–40% of a styrene monomer.

The coating further includes as a catalyst component from 1–50% and preferably about 2–6% of a catalyst selected from the group consisting of methyl ethyl ketone peroxide and cumyl hydrogen peroxide, with cumyl hydrogen peroxide being preferred.

Still further, the coating includes, as a reduction step prior to addition of the catalyst component, a second organic solvent or organic solvent mixture of low volatility.

More preferably, the filler/glazing component comprises: a combination of 30–44% by weight of the overall filler/glazing components of a vinyl ester resin and 30–36% by weight of a polyester resin, 30–40% by weight of a styrene monomer, 0.1–4% by weight of a coloring agent selected from the group consisting of titanium dioxide, black oxide, acetylene black, or mixtures thereof, 0.1–2% of an accelerator selected from the group consisting of demethyl aniline, cobalt naphthenate, copper nathenate, potassium hexanoate, dimethyl para toluidine, cobalt neodecanoate, or mixtures thereof; from about 2–10% by weight of a filler such as talc; from about 1–4% by weight of a mixture of thixotropic clays, from about 1–10% by weight calcium strontium zinc phosphosilicate, and from about 5–10% by weight of a first organic solvent or organic solvent mixture.

The coating further includes as a catalyst component from 1–50% and preferably about 2–6% of a catalyst selected from the group consisting of methyl ethyl ketone peroxide and cumyl hydrogen peroxide, with cumyl hydrogen peroxide being preferred.

Still further, the coating includes, as a reduction step prior to addition of the catalyst component, a second organic solvent or organic solvent mixture selected from the group consisting of alkoxyalkanols and ketone solvents containing 5–10 carbons.

Still more preferably, the filler/glazing component comprises: a combination of 40–42% by weight of the overall filler/glazing components of a vinyl ester resin and 30–36% by weight of a polyester resin, 30–40% by weight of a styrene monomer, 0.1–4% by weight of a coloring agent selected from the group consisting of titanium dioxide, black oxide, acetylene black, or mixtures thereof, 0.1–1% of an accelerator selected from the group consisting of dimethyl aniline, copper nathenate, cobalt neodecanoate, or mixtures thereof; from about 2–5% by weight of a filler such as talc; from about 0.1–1.0% by weight of a mixture of thixotropic clays, from about 1–10% by weight calcium strontium zinc phosphosilicate, and from about 5–10% by weight of a first organic solvent or organic solvent mixture.

The coating further includes as a catalyst component from 1–50% and preferably about 2–6% of a catalyst selected from the group consisting of methyl ethyl ketone peroxide and cumyl hydrogen peroxide, with cumyl hydrogen peroxide being preferred.

Still further, the coating includes, as a reduction step prior to addition of the catalyst component, from about 1–15% by weight of a second organic solvent or organic solvent mixture selected from the group consisting of alkoxyalkanols and ketone solvents containing 5–10 carbons.

The most preferred filler/glazing component comprises: a combination of 40–42% by weight of the overall filler/glazing components of a vinyl ester resin and 30–36% by weight of a polyester resin, 30–40% by weight of a styrene monomer, 0.1–2% by weight of a coloring agent selected from the group consisting of titanium dioxide, black oxide, acetylene black, or mixtures thereof, 0.01–0.5% of an accelerator selected from the group consisting of dimethyl aniline, copper nathenate, cobalt neodecanoate, or mixtures thereof; from about 2–5% by weight of a filler such as talc; from about 0.1–0.5% by weight of a mixture of thixotropic clays, from about 4–6% by weight calcium strontium zinc phosphosilicate, and from about 5–10% by weight of a first organic solvent or organic solvent mixture.

The coating further includes as a catalyst component from 1–50% and preferably about 2–6% of a catalyst selected from the group consisting of methyl ethyl ketone peroxide and cumyl hydrogen peroxide, with cumyl hydrogen peroxide being preferred.

The coating further includes, as a reduction step prior to addition of the catalyst component, 5–10% by weight of a second organic solvent or organic solvent mixture selected from the group consisting of alkoxyalkanols and ketone solvents containing 5–10 carbons.

The coating of the present invention is applied as indicated in U.S. Pat. No. 5,371,117 which is hereby incorporated by reference and is dry to the touch in 10 minutes with heat, dry to handle in 30 minutes with heat, and recoatable in one hour with or without heat. This coating has very high percentages of reactive material (solids contents). It demonstrates superior adhesion to many various substances unlike most unsaturated compounds. This coating also demonstrates exceptional corosion resistance. It also demonstrates superior crosshatch adhesion to many dissimilar substrates and a high degree of flexibility which is uncommon to most coatings and especially unsaturated resin based coating. It is also bake temperature resistant, does not require sanding and demonstrates a high level of conductivity for subsequent electrostatic applications of top coats in its preferred embodiments.

This coating also has high build capabilities when compared to conventional primer/highbuild primers. They are generally only capable of 0.8–2.5 mils of deposition, where the present coating can build up to 6 mils in subsequent wet on wet coats without sagging or running and without causing mud-cracking due to deposition or otherwise greatly affect the cure of the coating.

Because the coating has an uncommonly high reactive volume concentration, it has the ability to fill and bridge all the areas of concern, even "low-density" material, thereby eliminating the solvent popping problems. Also, it has exceptional adhesion to unprepared SMC as tested via ASTM sanctioned cross-hatch adhesion test.

While certain representative embodiments and details have been shown for purposes of illustrating the invention, it will be apparent to those skilled in the art that various changes in the product disclosed herein may be made without departing from the scope of the invention, which is defined in the appended claims.

What is claimed is:

1. A sprayable coating composition for use as a coating on a substrate comprising:
   a) a filler/glazing component comprising a mixture of
      from about 20% to about 80% by weight of a resin selected from the group consisting of vinyl ester resins and vinyl ester resins in combination with polyester resins;
      from about 2% to about 35% by weight of a sprayable filler;
      from about 0–40% by weight of a styrene monomer;
      from about 0.1% to about 15% by weight of a mixture of thixotropic clays;
      from about 1–10% by weight of a phosphosilicate;
      from about 0–2% by weight of an accelerator; and
      from about 0–20% by weight of a first organic solvent or organic solvent mixture selected from the group consisting of highly volatile solvents, solvents of medium volatility, and mixtures thereof;
   b) from about 1–50% by weight of a catalyst component; and
   c) from about 1–15% by weight of a second organic solvent or organic solvent mixture selected from the group consisting of solvents of low volatility and mixtures thereof.

2. A sprayable coating composition according to claim 1 wherein the filler/glazing component of the coating further contains 0–1% by weight of activated fumed silica.

3. A sprayable coating composition according to claim 2 wherein the filler/glazing component of the coating further contains 0–5% by weight of acrylic resin.

4. A sprayable coating composition according to claim 1 wherein the resin of the filler/glazing component comprises a combination of a vinyl ester resin and a polyester resin.

5. A sprayable coating composition according to claim 4 wherein the polyester resin comprises a combination of an auto resin (ortho polyester) and a bonding ortho NPG polyester.

6. A sprayable coating composition according to claim 1 wherein the filler/glazing component further includes a coloring agent selected from the group consisting of titanium dioxide, black iron oxide and acetylene black.

7. A sprayable coating composition according to claim 1 wherein the accelerator is selected from the group consisting of dimethyl aniline, cobalt naphthenate, copper napthenate, potassium hexanate, dimethyl paratoluidine, cobalt neodecanate, and mixtures thereof.

8. A sprayable coating composition according to claim 1 wherein the phosphosilicate is calcium strontium zinc phosphosilicate.

9. A sprayable coating composition according to claim 1 wherein the sprayable filler is talc.

10. A sprayable coating composition according to claim 1 wherein the first organic solvent comprises a mixture of acetone and ethyl acetate.

11. A sprayable coating composition according to claim 1 wherein the second organic solvent is selected from the group consisting of alkoxyalkanols and ketones having 5–10 carbon atoms, and mixtures thereof.

12. A sprayable coating composition according to claim 1 wherein the catalyst is selected from the group consisting of methyl ethyl ketone peroxide and cumyl hydrogen peroxide.

13. A sprayable coating composition for use as a coating on a substrate comprising:
   a) a filler/glazing component comprising a combination of
      1) 40–42% by weight of the overall filler/glazing components of a vinyl ester resin and 2) 30–36% by weight of a polyester resin, which polyester resin comprises a combination of 9–12% of an auto resin (ortho polyester) and 21–24% by weight of
      a bonding ortho NPG polyester;
      from about 2% to about 5% by weight of talc;
      from about 30–40% of a styrene monomer;
      from about 0.1% to about 0.5% by weight of a mixture of thixotropic clays;
      from about 3–5% by weight of calcium strontium zinc phosphsilicate;
      from about 0.1–1% by weight of acetylene black;
      from about 0.1–0.5% by weight of an accelerator selected from the group consisting of dimethyl aniline, copper naphthenate and cobalt neodecanate, and mixtures thereof; and
      from about 5–10% by weight of a first organic solvent mixture comprising acetone and ethyl acetate;

b) from about 3–6% by weight of catalyst; and c) from about 1–15% by weight of an alkoxyalkanol.

14. A sprayable coating composition for use as a coating on a substrate comprising:

a) a filler/glazing component comprising a combination of 1) about 40.5% by weight of the overall filler/glazing components of a vinyl ester resin and 2) about 33.9% by weight of a polyester resin, which polyester resin comprises a combination of about 10.6% of an auto resin (ortho polyester) and about 23.3% by weight of a bonding ortho NPG polyester;

about 3.7% by weight of talc;

about 35% by weight of a styrene monomer;

about 0.4% by weight of a mixture of thixotropic clays;

about 5% by weight of calcium strontium zinc phosilicate;

about 1.2% by weight of acetylene black;

about 0.45% by weight of an accelerator comprised of about 0.050% by weight dimethyl aniline, about 0.1% by weight copper naphthenate and about 0.3% by weight cobalt neodecanate; and about 10% by weight of a first organic solvent mixture comprising about 50% by weight of acetone and about 50% by weight of ethyl acetate;

b) about 5% by weight of cumyl hydrogen peroxide; and c) about 10% by weight of 2-butoxyethanol.

\* \* \* \* \*